United States Patent [19]

DeMartino

[11] Patent Number: 6,128,113
[45] Date of Patent: Oct. 3, 2000

[54] TRANSPARENT OPTICAL COMMUNICATIONS SWITCH

[75] Inventor: Kevin A. DeMartino, Andover, Mass.

[73] Assignee: Dynamics Research Corporation, Andover, Mass.

[21] Appl. No.: 09/034,482

[22] Filed: Mar. 4, 1998

[51] Int. Cl.[7] .................................................. H04J 14/00
[52] U.S. Cl. ..................... 359/117; 359/123; 359/128; 359/140
[58] Field of Search .................. 359/117, 128, 359/123, 140

[56] References Cited

U.S. PATENT DOCUMENTS

| | | | |
|---|---|---|---|
| 3,838,278 | 9/1974 | Duguay et al. | 250/277 |
| 3,849,604 | 11/1974 | Benes et al. | 179/15 AQ |
| 4,365,863 | 12/1982 | Broussaud | 350/96.15 |
| 4,496,211 | 1/1985 | Daniel | 350/96.16 |
| 4,781,427 | 11/1988 | Husbands et al. | 350/96.16 |
| 4,970,717 | 11/1990 | Haas | 370/60 |
| 4,999,832 | 3/1991 | Chen et al. | 370/85.14 |
| 5,043,975 | 8/1991 | McMahon | 359/128 |
| 5,077,727 | 12/1991 | Suzuki et al. | 359/123 |
| 5,107,361 | 4/1992 | Kneidinger et al. | 359/135 |
| 5,121,240 | 6/1992 | Acampora | 359/138 |
| 5,195,162 | 3/1993 | Sultan et al. | 385/130 |
| 5,285,305 | 2/1994 | Cohen et al. | 359/110 |
| 5,317,658 | 5/1994 | Bergland et al. | 385/16 |
| 5,341,234 | 8/1994 | Suzuki et al. | 359/117 |
| 5,422,772 | 6/1995 | Udd et al. | 359/119 |
| 5,438,445 | 8/1995 | Nakano | 359/124 |
| 5,443,227 | 8/1995 | Hsu | 244/3.12 |
| 5,448,660 | 9/1995 | Calvani et al. | 385/21 |
| 5,488,500 | 1/1996 | Glance | 359/127 |
| 5,502,782 | 3/1996 | Smith | 385/7 |
| 5,528,283 | 6/1996 | Burton | 348/13 |
| 5,550,818 | 8/1996 | Brackett | 370/60 |
| 5,555,118 | 9/1996 | Huber | 359/125 |
| 5,572,347 | 11/1996 | Burton et al. | 359/124 |
| 5,579,143 | 11/1996 | Huber et al. | 359/130 |
| 5,600,466 | 2/1997 | Tsushima et al. | 359/124 |
| 5,659,351 | 8/1997 | Huber | 348/7 |
| 5,734,486 | 3/1998 | Guillemot et al. | 359/139 |
| 5,825,517 | 10/1998 | Antoniades et al. | 359/117 |
| 5,828,472 | 10/1998 | Masetti | 359/123 |

OTHER PUBLICATIONS

Delisle et al., "A Guide to Data Communications —B ISDN and How it Works" IEEE Spectrum, Aug. 1991.

Brackett et al., "A Scalable Multiwavelenght Multi Optical Network: A Proposal for research on All–Optical Networks" Journal of Lightwave Technology 11:5/6 pp. 736–752 Mar. 1993.

Bohm et al., "The DTM Gigabit Network," Journal of High Speed Networks, 3:109–126, 1994.

DeMartino, Kevin, "STM Versus ATM Signal Processing," Presented at ICSPAT Conference, Oct. 1996.

DeMartino, Kevin, "Processing of Synchronous Communications Signals," Presented at ICSPAT Conference, Oct. 1995.

*Primary Examiner*—Leslie Pascal
*Assistant Examiner*—Hanh Phan
*Attorney, Agent, or Firm*—Weingarten, Schurgin, Gagnebin & Hayes LLP

[57] ABSTRACT

A communications switch that connects together multiple communicating nodes such that optical signals flow transparently through the switch. Each node is connected to the switch by an optical cable containing input and output optical fibers, with each fiber containing optical signals at multiple wavelengths. For each multi-fiber cable, an optical beam is formed containing the input signals from that cable. Within each beam, the different input signals are spatially adjacent to each other. The signals within a particular beam are spatially gated to form multiple beam segments. Each of these beam segments is spatially shifted to a different output, where it is combined with beam segments obtained from the inputs from other cables. Signals from multiple beam segments are concentrated onto the output fibers of each multi-fiber cable. With this approach, the beams flow along optically transparent paths through the switch, and the characteristics of the optical signals are unaltered as the signals flow through the switch.

15 Claims, 8 Drawing Sheets

TRANSPARENT OPTICAL COMMUNICATIONS SWITCH

BACKGROUND OF THE INVENTION

This invention relates to the field of communications, and more particularly to systems in which optical signals are switched among multiple network nodes communicating via fiber optic cables.

Optical switches for switching of optical communications signals among communicating nodes are generally known in the art. For example, U.S. Pat. No. 4,365,863 to Broussard (1982) discloses a communications switching system comprising two optical fiber arrays facing one another, an input array and an output array. Optical beams are formed such that each beam contains the signals from a single input fiber. Each beam is deflected toward a signal output fiber and concentrated onto that fiber. For each pair of input/output fibers a separate mechanism for beam forming, conversion, deflecting, and control is used.

Two papers have been authored by the inventor Kevin DeMartino that describe techniques for optical switching in which each node is connected to the switch by a cable containing multiple optical fibers. One paper is entitled "Processing of Synchronous Communications Signals", and the other is entitled "STM Versus ATM Signal Processing". These papers were submitted in the Proceedings of the $6^{th}$ and $7^{th}$ International Conferences on Signal Processing Applications and Technology (ICSPAT) respectively.

In switches described in those papers, optical beams are formed such that within each beam the input signals from a particular cable are spatially adjacent to each other. The signals within each beam are gated and shifted to the appropriate output. With this approach, signals from multiple adjacent input fibers can be switched as a group. The fibers included in each group can be dynamically assigned. The characteristics of the optical signals are unaltered as the signals flow through the switch and the associated data rates are not limited by the switch. This technique enables switching as a group those signals contained in multiple adjacent fibers, rather than individually switching the signals associated with each fiber. The number of groups of fibers, which is related to the number of nodes that must be connected together, can be significantly less than the number of individual fibers. Consequently, with the described technique, the number of switching elements and the overall complexity of the switch can be significantly reduced.

With the techniques described above all the signals within an optical fiber are switched intact; the signals within a particular fiber are all routed to the same destination. The input fibers within a cable are spatially separate and can be viewed as space channels. Thus in the above-described techniques an integral number of space channels are assigned to each connection through the switch. This results in coarse quantization of assigned channels. The channel utilization is low unless the data rates are very high and there are several space channels per connection. Also, the number of fibers within a cable and the number of space channels is limited. Consequently, the number of nodes that can be connected to the switch is limited by the number of fibers per cable and the number of fibers used by each node to communicate with the other nodes.

An additional drawback of the above-described techniques appears in larger networks, in which switches are used in combination to form a network or segment of a network. A network segment composed of switches similar to the switches described above typically requires many more space channels than an individual switch. Multiple space channels must be provided for each connection through the network segment. This restriction limits the size of the network segment and the number of nodes that can be connected to it.

BRIEF SUMMARY OF THE INVENTION

The present invention enables communications among communicating nodes each of which is connected to the switch by one or more fiber-optic cables whose optical fibers carry input and output wavelength-division-multiplexed (WDM) optical signals to and from the switch. Corresponding to each fiber and each allowable wavelength of the WDM signals within the fiber, there exists a space-wavelength channel. The present invention extends the optical space switching concept described above to provide for switching of space-wavelength channels. This results in finer-grain switching and a more efficient utilization of channel capacity compared to the prior art.

The disclosed switch contains a multiplexing optical element optically coupled to fibers in each cable carrying output WDM signals from the switch, the multiplexing optical element generating the output WDM signals by concentrating beam segments directed to it onto the fibers to which it is coupled. Also, for each cable a demultiplexing optical element is optically coupled to fibers carrying input WDM signals to form a corresponding optical beam including coplanar spatially-adjacent sets of optical rays. Each set of rays is produced from the corresponding input WDM signals within a particular optical fiber. Each ray within a particular set corresponds to a different wavelength component of the input WDM signals. In preferred embodiments, the multiplexing and demultiplexing elements are dispersive optical media such as glass with a wavelength-dependent index of refraction.

The switch has a set of optical gates for each formed optical beam. Each optical beam is split into beam segments, and each optical gate selects a contiguous group of optical rays in a corresponding beam segment to form a gated beam segment. A preferred optical gate includes two opaque gate elements interspersed with voltage-controlled beam deflectors, one directing the beam to block one outer beam portion, and another directing the beam to block the opposite outer beam portion. The unblocked portion forms the gated beam segment. An optical shifting element directs this gated beam segment to a multiplexing optical element. Each multiplexing optical element receives beam segments originating from multiple inputs and concentrates the signals within these beam segments onto fibers associated with the element.

The switch thus allows signals within each fiber to be separated and transmitted to different locations, and therefore provides more flexibility in the assignment of fiber capacity to connections and more efficient utilization of that capacity. The switch demultiplexes the input WDM signals from each connected node into their constituent wavelength components, and distributes selectable groups of space-wavelength channels directly to each of the other connected nodes. One advantage achieved is that the assignment of channels to connections can be more finely quantized compared with the cited prior art, resulting in a more efficient utilization of channel capacity. Also, as mentioned, signals contained within each optical fiber can be routed to multiple locations, providing desirable flexibility in the assignment of channels.

The disclosed switch can be used in combination with other such switches to form a network segment. Signals that follow a common path through the network segment can be bundled together and switched as an entity at each network node. A large number of channels are required to accommodate the different paths through a network segment that is connected to a large number of nodes. With the prior art, a network segment of optical switches can accommodate only a small number of nodes. With the present invention, a network segment composed of transparent optical switches can support a relatively large number of nodes.

Further objects and advantages will become apparent from a consideration of the ensuing description and drawings.

DETAILED DESCRIPTION OF THE INVENTION

Figure 1:
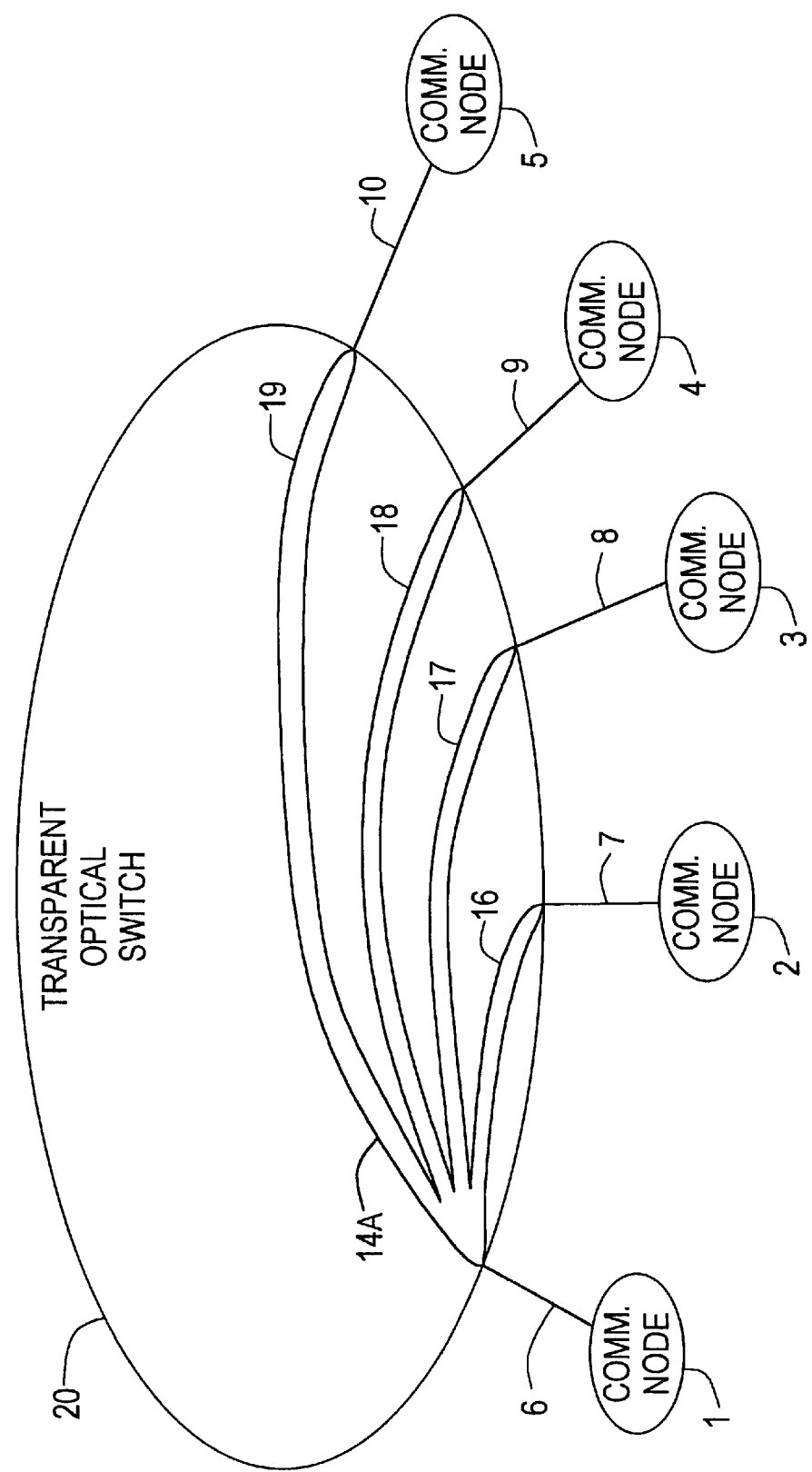
FIG. 1 is a block diagram of an optical communications system including a transparent optical switch according to the principles of the present invention.

In FIG. 1, five communicating nodes 1, 2, 3, 4, and 5 are connected together by a transparent optical switch 20. The nodes may be, for example, network switches. Each of the nodes is connected to the switch 20 by a corresponding multi-fiber cable 6, 7, 8, 9, and 10. In the illustrated embodiment, each cable contains three input and three output fibers. Each fiber carries six wavelength-division-multiplexed (WDM) signals in each direction between a particular node and the switch. Within the switch 20, an optical beam is formed containing all the input signals from each multi-fiber cable, which corresponds to all the input signals originating from the corresponding node. For example, beam 14A is formed from the input signals originating from node 1. The beam is divided into four segments, with each segment containing signals destined for a particular other node (e.g., nodes 2, 3, 4, and 5 respectively). Each of these beam segments flows along a transparent optical path to the switch output corresponding to a particular node. Similarly, other beams not shown in FIG. 1 are formed containing the input signals from each of the other multi-fiber cables 7, 8, 9, and 10. Each of these beams is divided into four beam segments, which flow long transparent paths to the other switch outputs.

Figure 2:
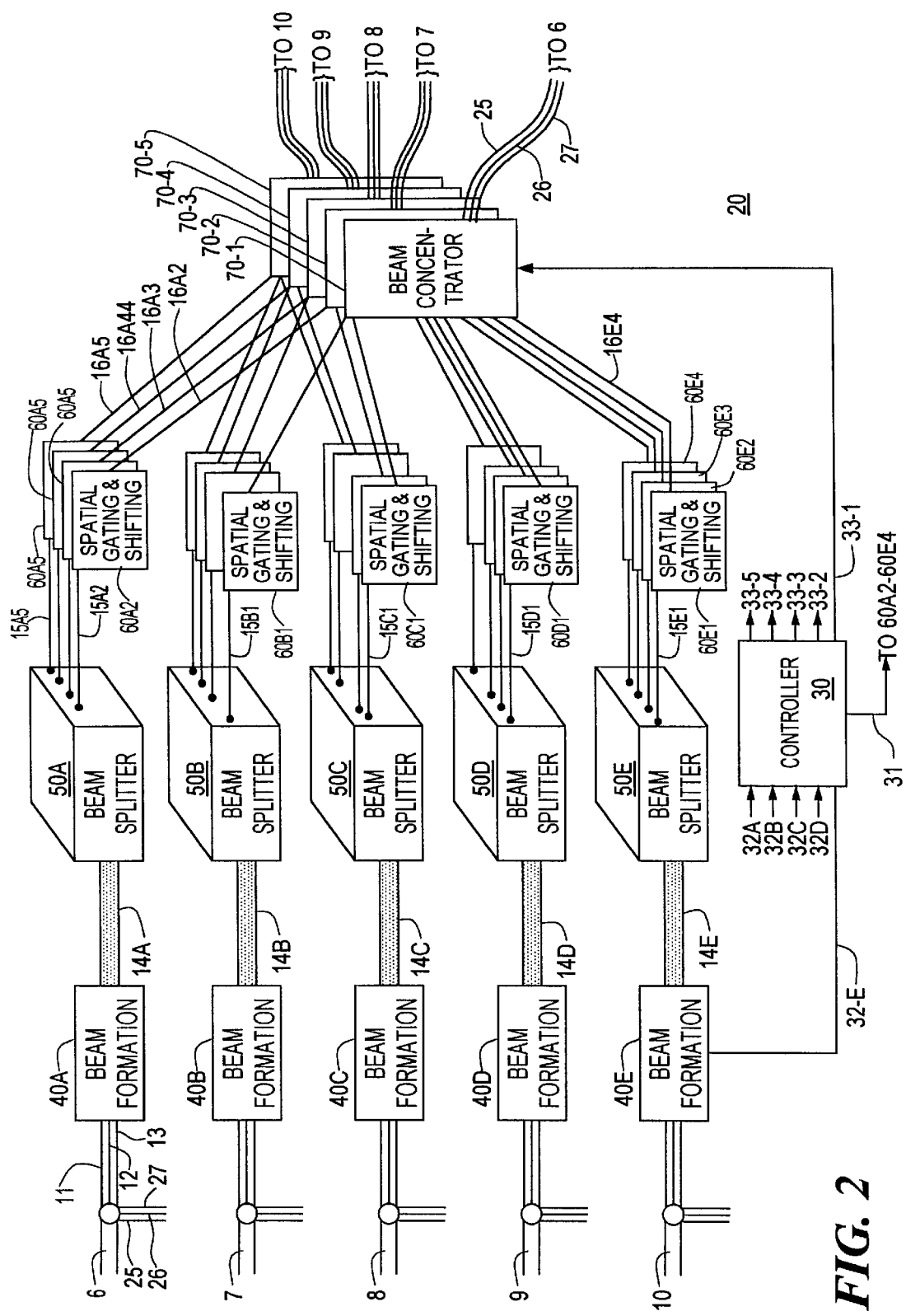
FIG. 2 is a block diagram of the optical switch shown in the system of FIG. 1.

FIG. 2 shows the elements that constitute an embodiment of the transparent optical switch 20. Several elements in FIG. 2 are arranged in a grid-like fashion. For clarity, the items arranged vertically have letter subscripts A–E, and items arranged horizontally into the page have numeric subscripts 1–5.

In the switch 20, the input signals carried by each cable are dispersed to form an optical beam. For each cable, the three input fibers are connected to a single beam formation device, which forms an optical beam containing optical rays for the different-wavelength components of the input WDM signals from the corresponding cable. For example, the input fibers 11, 12 and 13 from cable 6 are connected to beam formation device 40A which produces optical beam 14A.

A beam splitter divides the energy in each optical beam to form four identical replicated beams. The four beam replicas are directed to four corresponding spatial gating and shifting devices. For example, four beams from beam splitter 50A are directed to spatial gating and shifting devices 60A2–60A5, four beams from beam splitter 50B are directed to spatial gating and shifting devices 60B1 and 60B3–60B5, and so on.

Each spatial gating and shifting device selects a portion of the beam replica that it receives. For exampler spatial gating and shifting devices 60A2–60A5 produce gated and shifted beam segments 16A2–16A5, each containing selected optical rays from the corresponding beam replica 15A2–15A5 of beam 14A containing input signals from cable 6. These beam segments are directed by devices 60A2–60A5 to beam concentrators 70-2–70-5. The gated beam segments from the other spatial gating and shifting devices are likewise directed to the beam concentrators 70-1–70-5 in a similar fashion.

Each beam concentrator thus receives beam segments from gating and shifting devices associated with cables other than the cable to which the beam concentrator is coupled. For example, beam concentrator 70-1 receives beam segments from spatial gating and shifting devices 60B1, 60C1, 60D1, and 60E1. Similarly, beam concentrator 70-2 receives beam segments from spatial gating and shifting devices 60A2, 60C2, 60D2, and 60E2. The beam concentrators concentrate energy from these beam segments onto the output fibers of the cable to which the output of the beam concentrator is connected.

A controller 30 is responsible for controlling the operation of the switch via a control bus 31 that is distributed to all of the spatial gating and shifting devices 60A2–60E4. The controller 30 receives interconnection requests from the nodes via inputs 32A–32E, each derived from a dedicated input WDM control channel appearing on a fiber in the corresponding cable 6–10. The controller communicates information regarding channel assignments to the nodes via outputs 33-1–33-5, each signal being sent over a dedicated output WDM control channel appearing on a fiber in the corresponding cable 6–10. The operation of the controller 30 is described in greater detail below.

Figure 3:
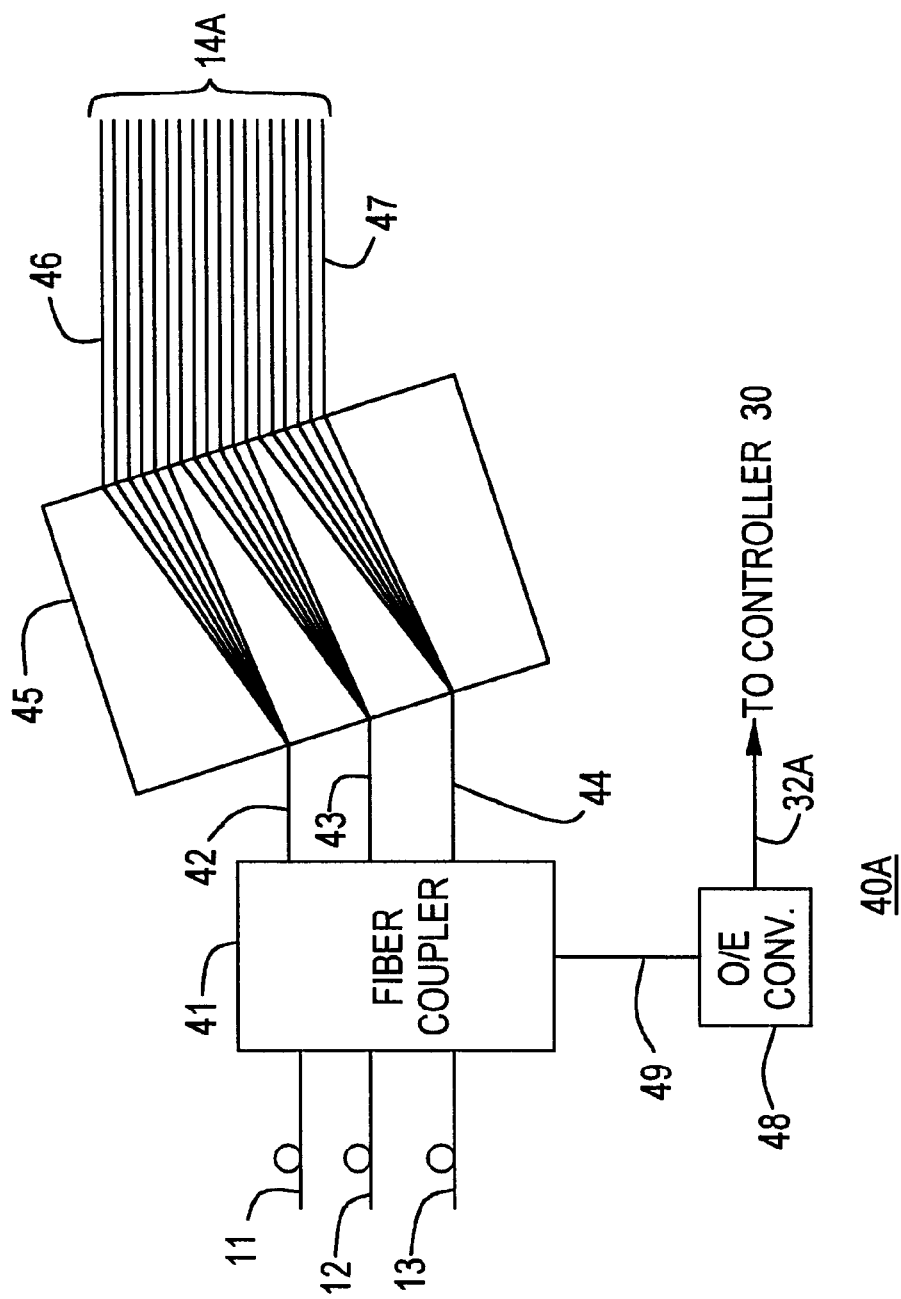
FIG. 3 is a schematic diagram of a beam formation device in the optical switch of FIG. 2.

FIG. 3 shows an expansion of the elements within the beam formation device 40A, which also represents the structure of the other beam formation devices 40B–40E. A fiber coupler 41 receives input signals from the fibers of a cable, and forms narrow beams represented by optical rays 42, 43, and 44, These rays are directed onto a dispersive medium 45. The signals at the six different wavelengths from each fiber are spatially separated by the dispersive medium, so that each input ray 42, 43, 44 produces six dispersed rays. The dispersed rays are aligned in coplanar fashion to form an optical beam 14A such that signals from different input fibers are adjacent within the beam and signals at different wavelengths within an input fiber are adjacent to each other. Thus, within optical beam 14, ray 46 corresponds to a signal within a first input fiber in the cable at wavelength 1. Ray 46 is followed by five rays corresponding to wavelengths 2 through 6 within the same input fiber, then six rays corresponding to wavelengths 1 through 6 within a second input fiber, and then six rays corresponding to wavelengths 1 through 6 within the third input fiber. Ray 47 corresponds to wavelength 6 within the third fiber.

As mentioned above, beam formation devices 40B–40E operate in a similar manner as device 40A to form beams 14B–14E respectively.

A separate channel within one input fiber of cable 6 is used to send control information such as interconnection requests from the node to the switch. This channel may be, for instance, a seventh wavelength within one of the fibers. An optical signal 49 representing this channel is separated from the other data signals, converted by an optical-to-electrical converter block 48 to an electrical signal 32A, and sent to the controller 30. Similarly, controller input signals 32B–32E are formed from signals within cables 7–10, respectively.

Figure 4:
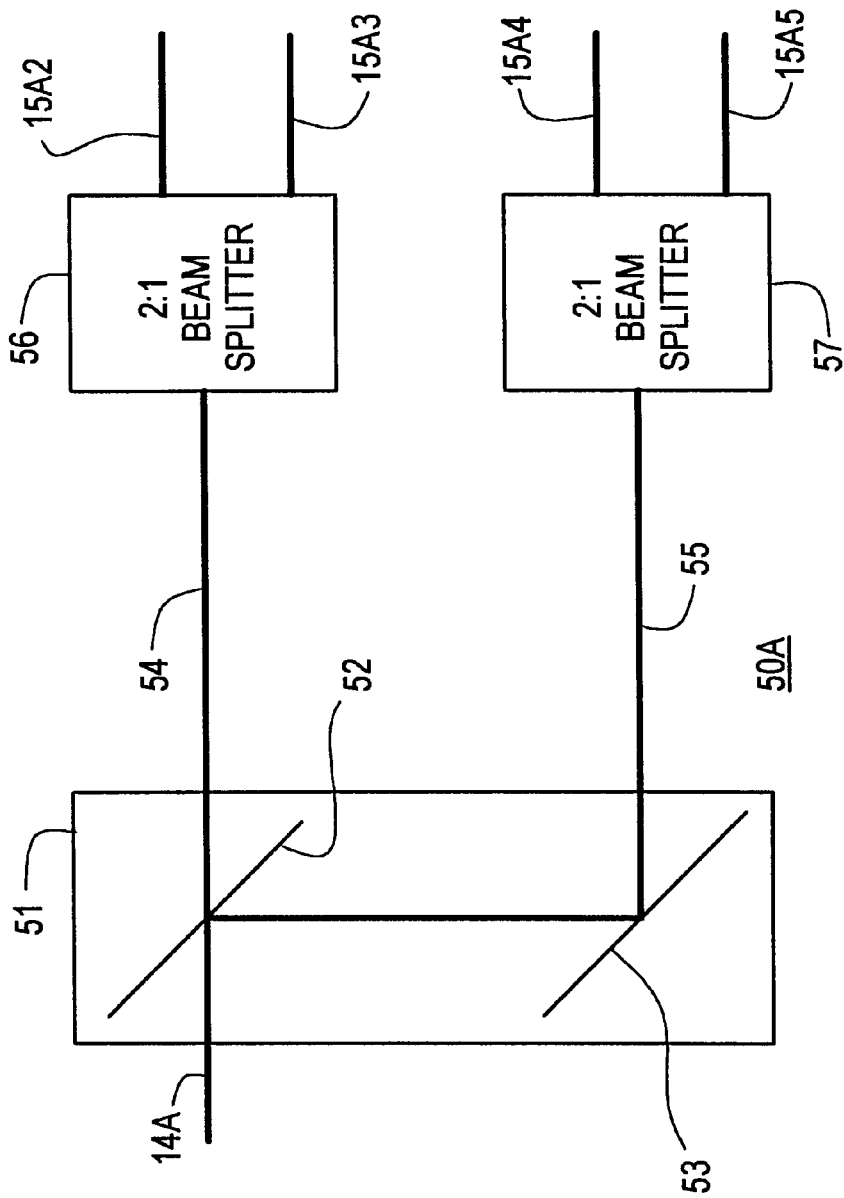
FIG. 4 is a schematic diagram of a beam splitter device in the optical switch of FIG. 2.

FIG. 4 shows how the optical beam 14A is replicated within a beam splitter block 50A. A 4:1 beam splitter is constructed using three 2:1 beam splitters 51, 56, and 57. Within block 51 the beam is split into two beams by a partially reflecting mirror 52, which reflects approximately half the energy in the beam and transmits the other half. A fully reflecting mirror 53 within block 51 redirects the reflected beam so that transmitted beam 54 and the reflected beam 55 are parallel at the output of the 2:1 beam splitter. Each of these two beams 54 and 55 is passed through another 2:1 beam splitter to generate a total of four replicated beams 15A2–15A5 at the output. Similarly four replicated beams are formed by each of the other beam splitters 50B–50E.

Figure 5:
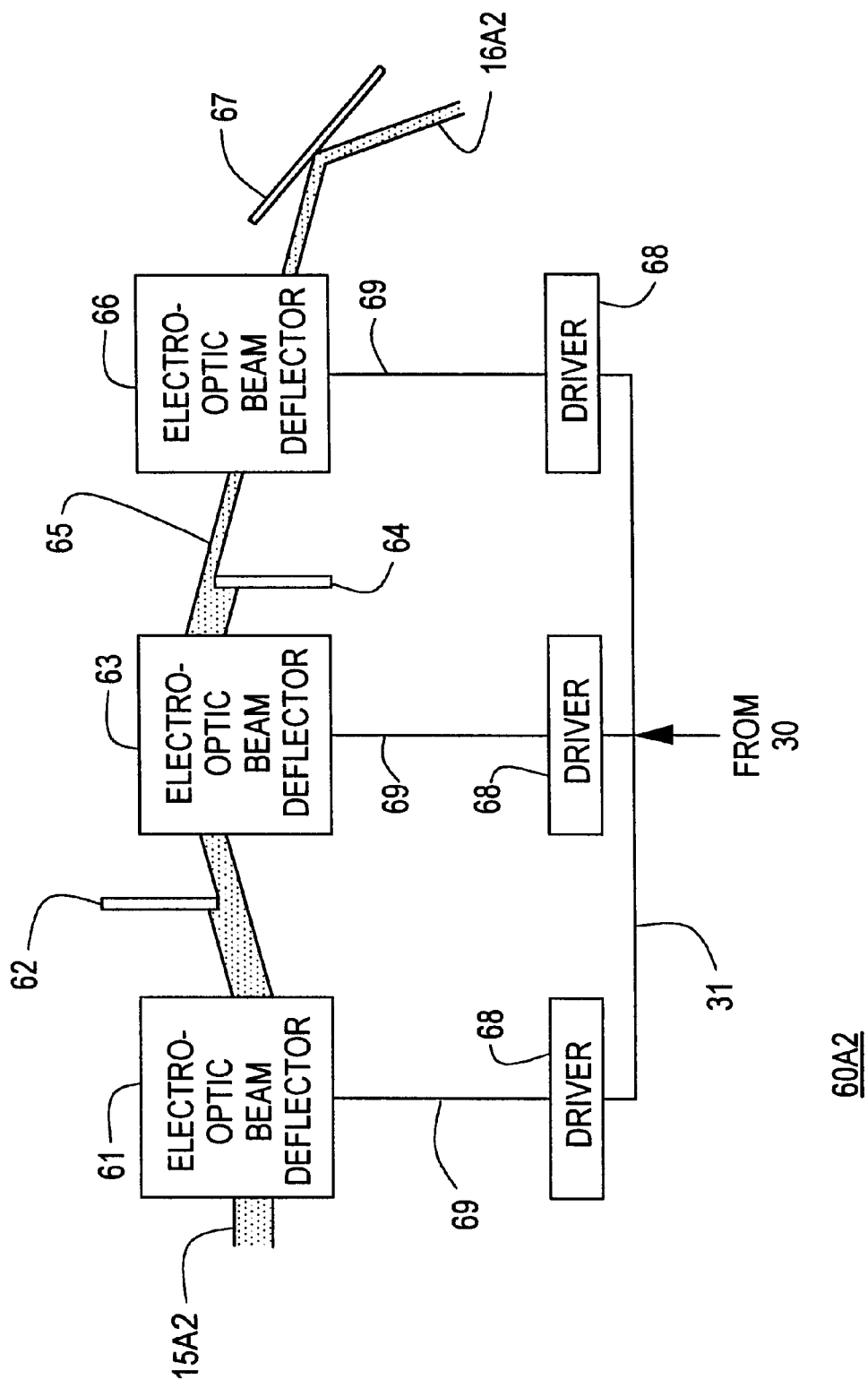
FIG. 5 is a schematic diagram of a beam gating and shifting device in the optical switch of FIG. 2.

FIG. 5 illustrates one spatial gating and shifting device 60A2. Each of three electro-optic beam deflectors 61, 63, and 66 changes the direction of the incoming beam by an amount that is determined by a corresponding applied control voltage 69 derived by a corresponding driver 68 from a signal on the control bus 31. The first and second beam deflectors 61 and 63 are used to select a beam segment containing a set of signals that are adjacent to each other. Beam deflector 61 directs the beam to an upper opaque beam gate 62 that blocks the upper part of the beam and allows the lower part of the beam to pass through. Beam deflector 63 redirects the beam to a lower opaque beam gate 64 that establishes the boundary for the lower part of the beam. A third beam deflector 66 directs the gated beam at the proper incident angle to a reflector 67 to direct the gated beam segment 16A2 to the appropriate beam concentrator 70-2.

In the switch of FIG. 2, there are 20 spatial gating and shifting (G/S) devices operating in a manner like that described above for device 60A2. Each of these devices receives a replicated bean from one of the beam splitters 50A–50E and directs a gated and shifted beam to one of the beam concentrators 70-1–70-5. Table 1 below identifies the beams connecting each of the 20 spatial gating and shifting devices with a particular beam splitter and a particular beam concentrator.

TABLE 1

| G/S | Beam Splitters | | Beam Concentrators | |
|---|---|---|---|---|
| Device | Device | Beam | Device | Beam |
| 60A2 | 50A | 15A2 | 70-2 | 16A2 |
| 60A3 | 50A | 15A3 | 70-3 | 16A3 |

TABLE 1-continued

| G/S | Beam Splitters | | Beam Concentrators | |
|---|---|---|---|---|
| Device | Device | Beam | Device | Beam |
| 60A4 | 50A | 15A4 | 70-4 | 16A4 |
| 60A5 | 50A | 15A5 | 70-5 | 16A5 |
| 60B1 | 50B | 15B1 | 70-1 | 16B1 |
| 60B3 | 50B | 15B3 | 70-3 | 16B3 |
| 60B4 | 50B | 15B4 | 70-4 | 16B4 |
| 60B5 | 50B | 15B5 | 70-5 | 16B5 |
| 60C1 | 50C | 15C1 | 70-1 | 16C1 |
| 60C2 | 50C | 15C2 | 70-2 | 16C2 |
| 60C4 | 50C | 15C4 | 70-4 | 16C4 |
| 60C5 | 50C | 15C5 | 70-5 | 16C5 |
| 60D1 | 50D | 15D1 | 70-1 | 16D1 |
| 60D2 | 50D | 15D2 | 70-2 | 16D2 |
| 60D3 | 50D | 15D3 | 70-3 | 16D3 |
| 60D5 | 50D | 15D5 | 70-5 | 16D5 |
| 60E1 | 50E | 15E1 | 70-1 | 16E1 |
| 60E2 | 50E | 15E2 | 70-2 | 16E2 |
| 60E3 | 50E | 15E3 | 70-3 | 16E3 |
| 60E4 | 50E | 15E4 | 70-4 | 16E4 |

Figure 6:
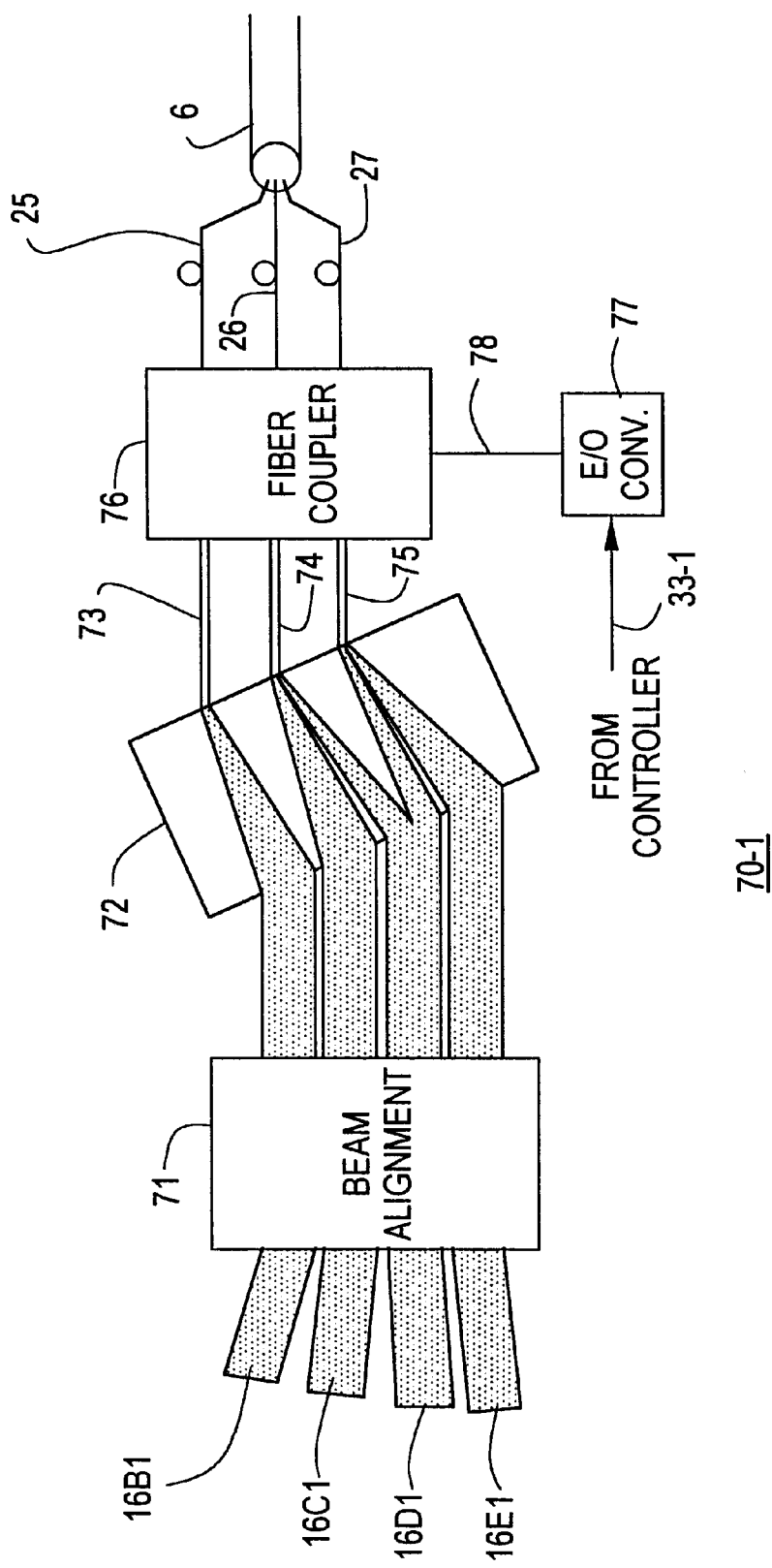
FIG. 6 is a schematic diagram of a beam concentrator in the optical switch of FIG. 2.

FIG. 6 shows the elements that constitute beam concentrator 70-1. Gated and shifted beams 16B1, 16C1, 16D1 and 16E1 from spatial gating and shifting devices 60B1, 60C1, 60D1 and 60E1 respectively are incident upon a beam alignment block 71. Each of these beam segments contains signals from a different set of inputs that are destined for the output fibers of the cable connected to the output of the beam concentrator. The beam alignment block 71 applies a predetermined deflection to the beam segments in order to align them. The aligned beam segments are applied to a dispersive medium 72, which is similar to dispersive medium 45 of FIG. 3 operated in reverse. The dispersive medium 72 takes spatially separate signals at different wavelengths and compresses them into narrow beams 73, 74, and 75. As shown with respect to FIG. 7 below, a compressed beam may contain signals from more than one gated and shifted beam. Also, the spatial relationship among the signals at different wavelengths has been reversed by the reflectors 67 in the spatial gating and shifting devices 60, so each reflected beam is the mirror image of the corresponding incident beam.

A fiber coupler 76 concentrates the signals in the compressed beams 73, 74, and 75 onto fibers 26, 26 and 27, which are carried within cable 6. A separate channel on fiber 27 is used for passing control signals such as channel assignment information from the switch 20 to communications node 1, which is attached to cable 6. A control output 33-1 from the controller 30 is converted to an optical signal 78 by electrical-to-optical converter 77 and coupled onto one of the output fibers within cable 6.

Beam concentrators 70-2, 70-3, 70-4 and 70-5 operate similarly to device 70-1; each concentrates signals onto output fibers within cables 7, 8, 9 and 10, respectively. For example, beam concentrator 70-2 receives beam segments 16A2, 16C2, 16D2 and 16E2 from spatial gating and shifting devices 60A2, 60C2, 60D2 and 60E2 respectively, and concentrates the signals within these beam segments onto the output fibers within cable 7. A separate output channel on one of the output fibers within each cable 7–10 is used for passing control signals 33-2 through 33-5 from switch 20 to communications nodes 2–5 respectively.

Figure 7:
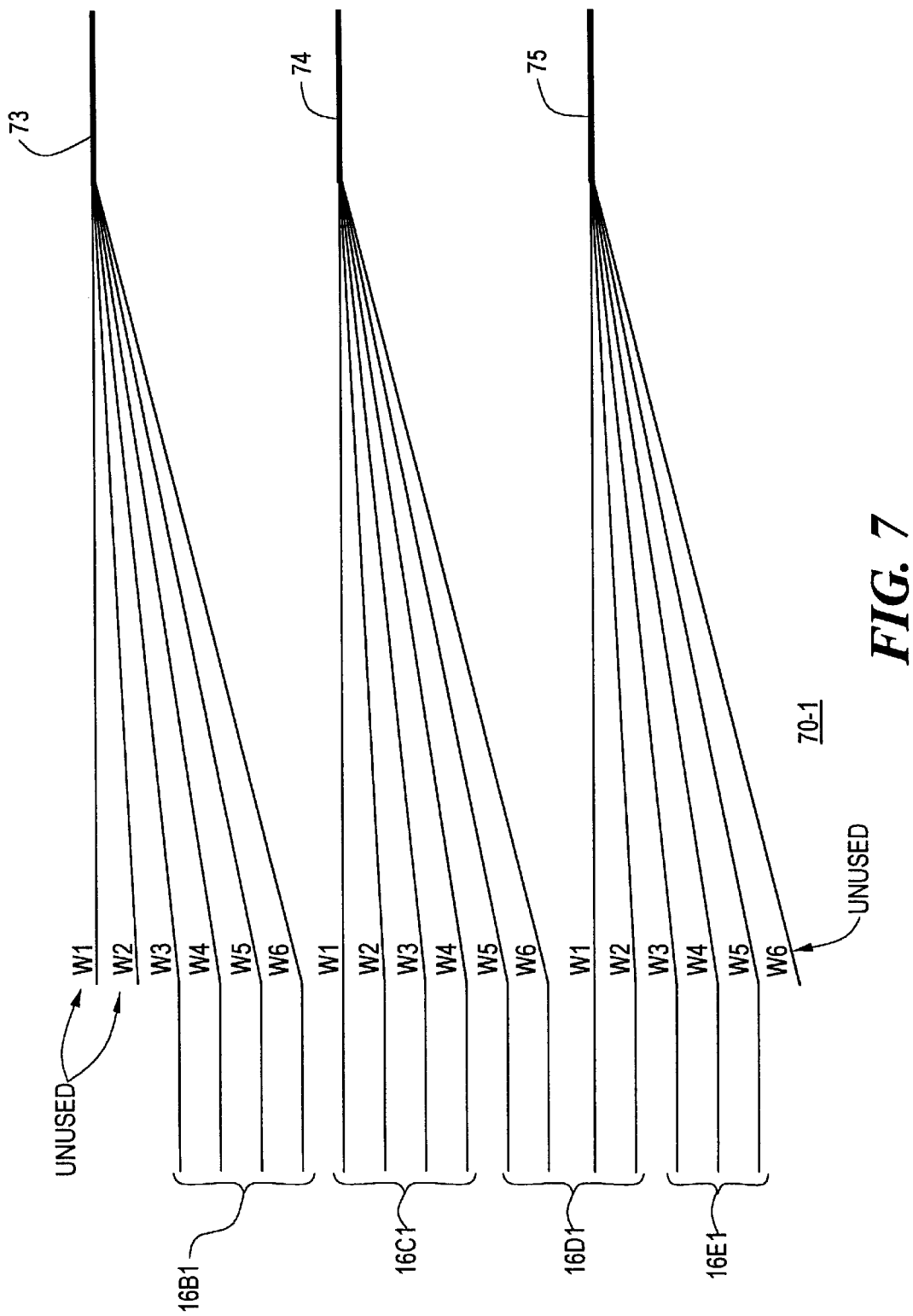
FIG. 7 is a diagram illustrating the operation of the beam concentrator of FIG. 6.

FIG. 7 shows an example of the operation of beam concentrator 70-1. As shown, beam segments 16B1, 16C1, 16D1 and 16E1 come in to the beam concentrator, from spatial gating and shifting devices 60B1, 60C1, 60D1, and 60E1, which are associated with the cables other than the one connected to the output of concentrator 70-1. The first beam includes wavelengths 3–6, a second 1–4, a third 5–6 and 1–2, and a fourth 3–5. The wavelengths in each beam segment are chosen so that the 3-cycle pattern of wavelengths 1–6 appears as shown. The dispersive medium 72 of FIG. 6 causes each set of 6 wavelengths to converge at a corresponding point, from which a single compressed beam having all six wavelengths emerges. Compressed beams 73, 74, and 75 are then coupled onto output fibers 25, 26 and 27 respectively.

Figure 8:
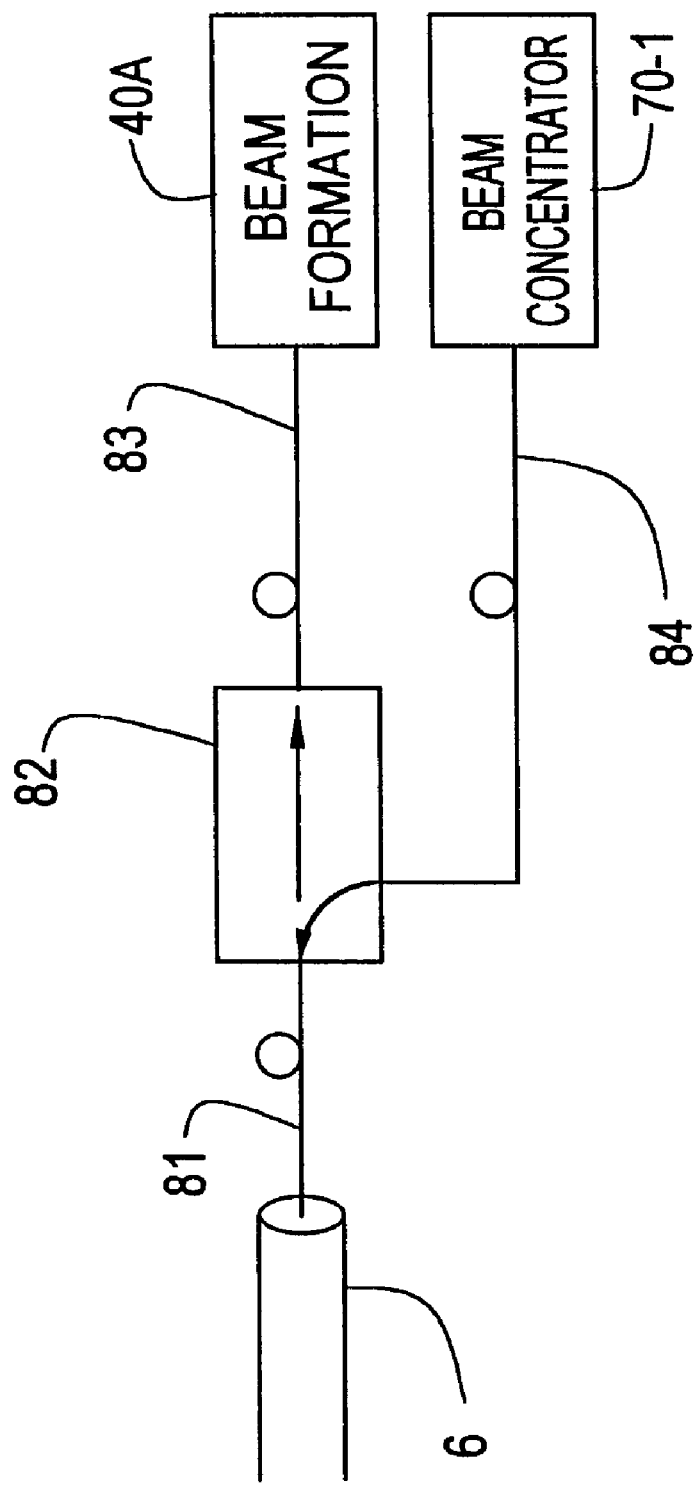
FIG. 8 is schematic diagram showing the combining of input and output optical signals on a single optical fiber in the switch of FIG. 2.

FIG. 8 shows a means for combining input and output signals on a single optical fiber. This is an alternative 26 to the preferred approach of carrying input and output signals on separate fibers. Input and output signals can be combined using a directional coupler 82. Signals flow from the output 84 of a beam concentrator 70-1 to an input/output (I/O) fiber 81 and from the I/O fiber 81 to the input 83 of a beam formation device 40A. The directional coupler ensures that there is minimal coupling between the output 84 and the input 83.

Operations

The transparent optical switch 20 shown in FIG. 1 connects five communications nodes 1, 2, 3, 4, and 5 to each other and switches signals among these nodes. The basic operation involves switching of space-wavelength channels between the inputs and outputs of the switch. Signals at each particular wavelength are switched from an input fiber to an output fiber. For each cable, there are four groups of input signals, one destined for each of the other four cables. An optical beam is formed with four adjacent beam segments, each containing one of the four groups of input signals. Within the switch there are five optical beams for a total of twenty beam segments. Each beam segment is guided to the proper output and combined with other beam segments destined for the same node. Each beam segment follows a path through the switch that is optically transparent.

An integral number of space-wavelength channels are assigned to each connection through the switch. Wavelengths are assigned such that at each output fiber there is at most one signal at a particular wavelength. To avoid conflicts, the assignment of wavelengths is coordinated among the nodes connected to the switch. The same wavelength may be assigned to three connections through the network as long as these connections employ separate fibers.

The controller 30 in FIG. 2 and its associated inputs and outputs 31, 32A–32E, and 33-1–33-5 provide a means for assigning space-wavelength channels to connections through the switch. Separate channels are used to provide control signals between the switch 20 and the nodes 1, 2, 3, 4, and 5, one control channel in each direction per cable. Preferably the control channel is a seventh wavelength channel for one input and one output fiber per cable. The controller 30 monitors the control inputs 32 for requests from the nodes for channel assignments. The controller determines which space-wavelength channels to assign to each connection based on requests for channel capacity and the availability of channels. Channel assignments are sent to the nodes via the control outputs 33-1–33-5. The controller 30 sends signals on the control bus 31 to control the switching of input signals to the proper corresponding outputs.

EXAMPLE

In this example it is assumed that wavelengths 1 and 2 on fiber 11 are to be assigned to a connection from node 1 to node 2. To select these signals, the upper gate 62 in spatial gating and shifting device 60A2 allows all the rays in its input beam replica to pass, and the lower gate 64 rejects the lower 16 rays in the beam replica. Thus the deflection for the upper gate 62 is set to 0 units, and the deflection for the lower gate 64 is set to 16 units.

It is further assumed that the signals are to appear on wavelengths 1 and 2 on the second output fiber for node 2. This being the case, the signals must be shifted by 6 units to arrive at the right location on the input to the beam concentrator 70-2. The third deflector 67 shifts the gated beam by 10 units, which corresponds to a shift of 16 units in one direction to compensate for the previous shift and 6 units in the other direction to direct the segment to the right spot on the beam concentrator 70-2.

Ramifications and Scope

Several of the specific features of the illustrated embodiment may be achieved by other means without departing from the present invention. For example, the dispersive media 45 and 72 respectively function to demultiplex and multiplex different-wavelength optical signals from/to multiple-wavelength signals; these demultiplexing and multiplexing functions may be performed by alternative optical structures known in the art. Additionally, the upper and lower beam gates 62 and 64 together form an adjustable aperture for selecting a beam segment; other means for forming an aperture or selecting a beam segment may be employed in alternative embodiments. It may also be desirable in alternative embodiments to allow input optical signals to be looped back to the same node from which they originated; such a structure may ease diagnostic testing of the communications system, for example. In such an embodiment, another spatial gating and shifting device 60 could be added per cable to create a fifth gated beam segment containing the loopback channel(s), and the beam splitters 50 and beam concentrators 70 would be extended to accommodate the fifth segment.

Additionally, the switch can connect different numbers of nodes, different numbers of input and output fibers per cable can be used, and a different number of wavelengths per fiber can be used. It is preferred that the cables all employ the same wavelength sets. However, a system may also be created in which the cables employ different, but overlapping, sets of wavelengths to form the wavelength channels. All these are alternative embodiments within the scope of the present invention, which is to be determined by the appended claims which follow and their legal equivalents.

I claim:

1. An optical switch for switching optical signals among a plurality of communicating nodes, each node being connected to the switch by one or more corresponding fiber-optic cables containing optical fibers collectively carrying input wavelength-division-multiplexed (WDM) optical signals to the switch from the node and output WDM optical signals from the switch to the node, the switch comprising:

for each cable containing fibers carrying output WDM signals from the switch, a multiplexing optical element optically coupled to such fibers, the multiplexing optical element being effective to generate the output WDM signals by concentrating beam segments directed to the multiplexing optical element onto the fibers to which it is coupled;

for each cable containing fibers carrying input WDM signals to the switch, a demultiplexing optical element optically coupled to such fibers, each demultiplexing optical element being effective to form a corresponding optical beam from the input WDM signals carried by the fibers to which it is coupled, each optical beam being formed to include coplanar spatially-adjacent sets of optical rays, each set being produced from the input WDM signals from a particular optical fiber, each ray in each set being a corresponding different wavelength component of the input WDM signals from which the set is produced;

for each optical beam formed by a demultiplexing optical element, a corresponding set of optical gates, each optical gate within each set being associated with a corresponding one of the multiplexing optical elements and being effective to select a contiguous group of optical rays in the formed optical beam to form a corresponding gated beam segment; and for each optical gate, a corresponding optical shifting element effective to direct the gated beam segment formed by the optical gate to the multiplexing optical element with which the optical gate is associated.

2. A switch according to claim 1, wherein each optical gate and optical shifting element is controlled by a corresponding control signal, and further comprising a controller for generating the control signals to establish desired communications channels among the nodes, each established communication channel including a corresponding gated beam segment, the gated beam segments being formed such that no more than one optical signal of any particular wavelength is multiplexed onto any given optical fiber.

3. A switch according to claim 1, wherein each demultiplexing optical element is a dispersive element effective to provide a desired separation among the sets of optical rays produced thereby and among the optical rays within each produced set.

4. A switch according to claim 1, wherein each multiplexing element is a dispersive element operating in reverse to provide output optical beams sufficiently narrow to be coupled to the fibers to which it is coupled.

5. A switch according to claim 1, wherein the WDM signals appearing in each fiber have the same set of optical wavelengths.

6. A switch according to claim 1, wherein each cable contains input fibers and output fibers, each input fiber carrying input WDM signals and no output WDM signals, and each output fiber carrying an output WDM signal and no input WDM signals.

7. A switch according to claim 1, wherein each cable contains bidirectional fibers each of which carries both input WDM signals and output WDM signals, and further comprising for each bidirectional fiber a directional coupler effective to couple the input WDM signals from the fiber to the corresponding demultiplexer element and to couple the output WDM signals of the corresponding multiplexer element to the fiber while maintaining optical isolation between the multiplexer output signals and demultiplexer output signals.

8. A switch according to claim 1, further comprising for each optical beam formed by a demultiplexing optical element a set of beam splitters effective to produce replicas of the formed optical beam and to direct each replica to a corresponding optical gate within the set of optical gates with which the optical beam is associated.

9. A switch according to claim 1, wherein each optical Sate comprises a pair of opaque elements arranged to have an aperture therebetween through which the corresponding gated beam segment emerges.

10. A switch according to claim 9, wherein each optical gate further comprises electro-optic beam deflectors interspersed with the opaque elements, a first deflector being effective to deflect the optical beam such that one opaque element blocks one outer portion of the beam, and a second deflector being effective to deflect the partially-gated beam segment emerging from the one opaque element such that the other opaque element blocks the other outer portion of the beam, the portion of the beam emerging from the other opaque element being the gated beam segment, and wherein the optical shifting element associated with each optical gate is a third deflector being effective to deflect the gated beam segment to the corresponding multiplexing element.

11. An optical switch for switching optical signals among a plurality of communicating nodes, each node being connected to the switch by one or more fiber-optic cables containing input optical fibers and output optical fibers, each input fiber carrying input wavelength-division-multiplexed (WDM) optical signals to the switch from the corresponding node and carrying no output WDM signals from the switch to the corresponding node, and each output fiber carrying output WDM signals from the switch to the corresponding node and no input WDM signals to the switch from the corresponding node, the switch comprising:

for each cable, an input dispersive optical element optically coupled to the input fibers of the cable and being effective to form a corresponding optical beam from the input WDM signals carried thereby, each optical beam being formed to include coplanar spatially-adjacent sets of optical rays, each set being produced from the input WDM signals appearing on a corresponding input fiber in the cable, each ray in each set being a corresponding different wavelength component of the input WDM signals from which the set is produced;

for each cable, an output dispersive optical element optically coupled to the output fibers of the cable, each output dispersive element being effective to generate the output WDM signals by concentrating beam segments directed to the output dispersive element onto the output fibers to which it is coupled;

for each optical beam formed by an input dispersive optical element, a corresponding set of beam splitters to which the formed optical beam is directed, each beam splitter in the set being associated with a corresponding one of the output dispersive elements and being effective to produce multiple replicas of the formed optical beam directed thereto;

for each beam splitter, a corresponding set of optical gates to which the beam replicas produced by the beam splitter are directed, each optical gate being effective to select a contiguous group of optical rays in the beam replica to form a corresponding gated beam segment; and for each optical gate, a corresponding optical shifting element being effective to direct the gated beam segment formed by the optical gate to the output dispersive element with which the beam splitter producing the beam replica directed to the optical gate is associated.

12. A switch according to claim 11, wherein each optical gate and optical shifting element is controlled by a corresponding control signal, and further comprising a controller for generating the control signals to establish desired communications channels among the nodes, each established communication channel including a corresponding gated beam segment, the gated beam segments being formed such that no more than one optical signal of any particular wavelength is multiplexed onto any given optical fiber.

13. A switch according to claim 11, wherein the WDM signals appearing in each fiber have the same set of optical wavelengths.

14. A switch according to claim 11, wherein each optical gate comprises a pair of opaque elements arranged to have an aperture therebetween through which the corresponding gated beam segment emerges.

15. A switch according to claim 14, wherein each optical gate further comprises electro-optic beam deflectors interspersed with the opaque elements, a first deflector being effective to deflect the optical beam such that one opaque element blocks one outer portion of the beam, and a second deflector being effective to deflect the partially-gated beam segment emerging from the one opaque element such that the other opaque element blocks the other outer portion of the beam, the portion of the beam emerging from the other opaque element being the gated beam segment, and wherein the optical shifting element associated with each optical gate is a third deflector being effective to deflect the gated beam segment to the corresponding output dispersive element.

* * * * *